Adam Ramage's
3701X
Press
No Printed Specification Available
PATENTED: 19 MAY: 1823.
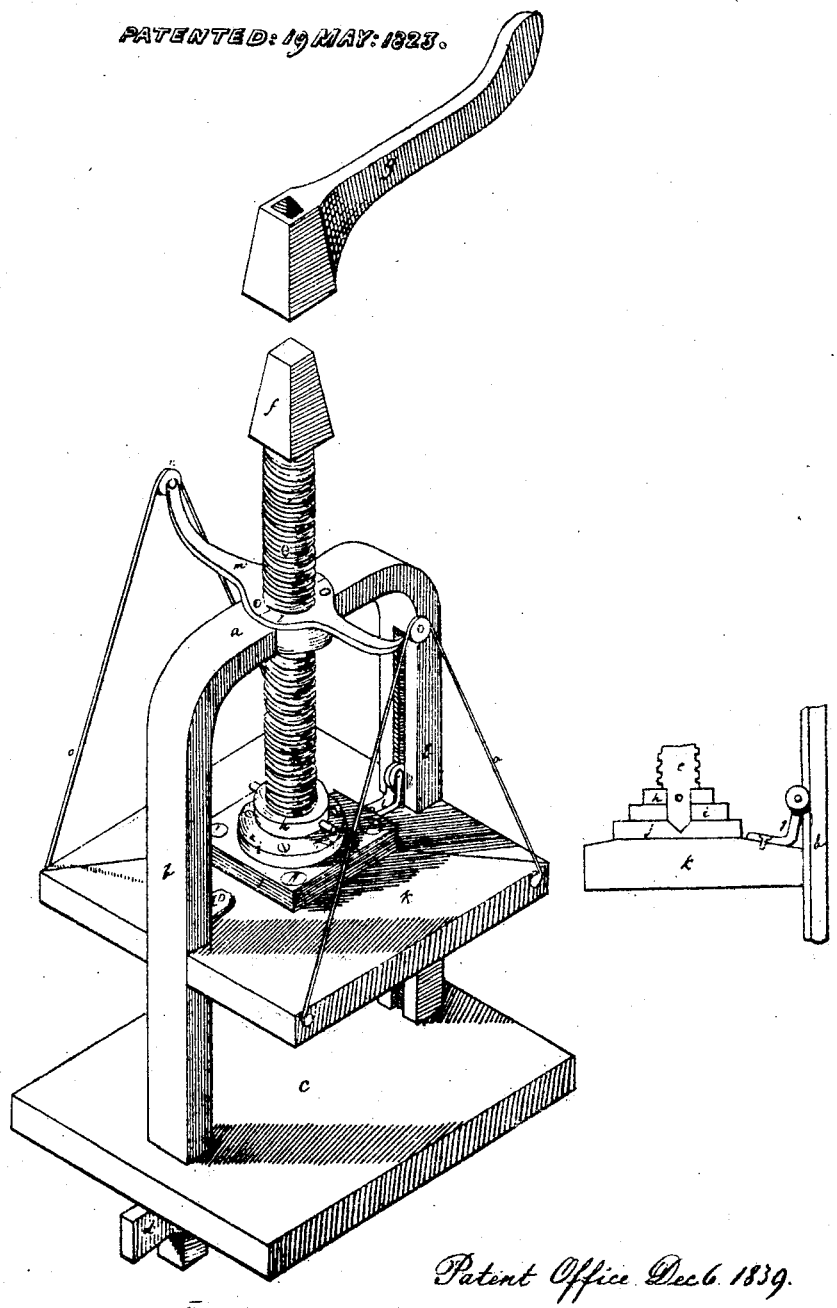
Patent Office Dec 6. 1839.
Made under the direction of the Commissioner of Patents, in conformity with Act: 3d March 1837.
Henry L Ellsworth
Comr. of Patents.

United States Patent Office

PTO - BOYERS, PA Duty Station

MISSING PAGE TEMPORARY NOTICE

PATENT # 3761X FOR ISSUE DATE 5-19-1823

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa